United States Patent
Girata, Jr. et al.

(10) Patent No.: US 10,642,717 B2
(45) Date of Patent: May 5, 2020

(54) APPLICATION USER INTERFACE TESTING SYSTEM AND METHOD

(71) Applicant: International Business Machines Corporation, Armonk, NY (US)

(72) Inventors: John Girata, Jr., Raleigh, NC (US); Bryan R. Florkiewicz, Durham, NC (US); Martin Presler-Marshall, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/028,637

(22) Filed: Jul. 6, 2018

(65) Prior Publication Data

US 2020/0012587 A1    Jan. 9, 2020

(51) Int. Cl.
  *G06F 9/44*   (2018.01)
  *G06F 11/36*  (2006.01)
  *G06F 8/38*   (2018.01)

(52) U.S. Cl.
  CPC ........... *G06F 11/3664* (2013.01); *G06F 8/38* (2013.01); *G06F 11/3676* (2013.01); *G06F 11/3684* (2013.01)

(58) Field of Classification Search
  None
  See application file for complete search history.

(56) References Cited

U.S. PATENT DOCUMENTS

| | | | |
|---|---|---|---|
| 7,099,893 B2 | 8/2006 | Bischof et al. | |
| 8,701,090 B2 | 4/2014 | Zavatone | |
| 9,189,254 B2* | 11/2015 | Kushman | G06F 9/453 |
| 2005/0096864 A1* | 5/2005 | Bonilla | G06F 11/263 |
| | | | 714/E11.177 |
| 2005/0268285 A1* | 12/2005 | Bagley | G06F 11/3688 |
| | | | 717/124 |
| 2012/0174069 A1* | 7/2012 | Zavatone | G06F 11/3692 |
| | | | 717/124 |
| 2013/0346950 A1 | 12/2013 | Horovitz et al. | |
| 2016/0077956 A1* | 3/2016 | Bhattacharya | G06F 11/3688 |
| | | | 717/124 |

* cited by examiner

*Primary Examiner* — Qamrun Nahar
(74) *Attorney, Agent, or Firm* — John Noh (57) ABSTRACT

A method, computer program product, and computing system device for monitoring a plurality of individual actions executed on at least a portion of a software application. It may be determined whether the plurality of individual actions executed on the at least a portion of the software application complete at least one test case of a plurality of test cases. The at least one test case may be marked as completed based upon, at least in part, determining that the plurality of individual actions executed on the at least a portion of the software application complete the at least one test case of the plurality of test cases.

17 Claims, 7 Drawing Sheets

| TEST CASE # | TESTING USERS | # OF TESTS COMPLETED | TEST CASE COMPLETION STATUS |
|---|---|---|---|
| TEST CASE 66 | USER 46 | 1 | COMPLETE |
| TEST CASE 68 | NONE | 0 | INCOMPLETE |
| TEST CASE 70 | USER 46 | 1 | INCOMPLETE |
| TEST CASE 72 | USER 46; USER 50 | 2 | COMPLETE |
| ○ ○ ○ | | | |
| TEST CASE N | NONE | 0 | INCOMPLETE |

APPLICATION USER INTERFACE TESTING SYSTEM AND METHOD

BACKGROUND

Software applications may often include user interfaces to simplify and improve user interaction. Development and testing of user interfaces for software applications may require several developers testing various features and reviewing the layout and design of a user interface before it is released. Existing application user interface testing may take many forms including manual and automated user interface testing; each with unique advantages and disadvantages.

BRIEF SUMMARY OF DISCLOSURE

In one example implementation, a computer-implemented method is executed on a computing device and may include but is not limited to monitoring, at a computing device, a plurality of individual actions executed on at least a portion of a software application. The method may further include determining whether the plurality of individual actions executed on the at least a portion of the software application complete at least one test case of a plurality of test cases. The at least one test case may be marked as completed based upon, at least in part, determining that the plurality of individual actions executed on the at least a portion of the software application complete the at least one test case of the plurality of test cases.

One or more of the following example features may be included. A test case of the plurality of test cases may be defined as a plurality of individual actions executed on the at least a portion of the software application. Defining the test case may include defining the test case as a predefined sequence of individual actions executed on the at least a portion of the software application. Defining the test case may include inserting a plurality of code hooks into code associated with the at least a portion of the software application. Monitoring the plurality of individual actions may include associating one or more individual actions of the plurality of individual actions with a specific user from a plurality of users. Determining whether the plurality of individual actions executed on the at least a portion of the software application complete at least one test case of a plurality of test cases may include recording each completion of the at least one test case of the plurality of test cases. Marking the at least one test case as completed may include marking the at least one test case as completed in response to determining that the at least one test case has been completed at least a predefined number of times.

In another example implementation, a computer program product resides on a non-transitory computer readable medium that has a plurality of instructions stored on it. When executed across one or more processors, the plurality of instructions cause at least a portion of the one or more processors to perform operations that may include but are not limited to monitoring a plurality of individual actions executed on at least a portion of a software application. The operations may further include determining whether the plurality of individual actions executed on the at least a portion of the software application complete at least one test case of a plurality of test cases. The at least one test case may be marked as completed based upon, at least in part, determining that the plurality of individual actions executed on the at least a portion of the software application complete the at least one test case of the plurality of test cases.

One or more of the following example features may be included. A test case of the plurality of test cases may be defined as a plurality of individual actions executed on the at least a portion of the software application. Defining the test case may include defining the test case as a predefined sequence of individual actions executed on the at least a portion of the software application. Defining the test case may include inserting a plurality of code hooks into code associated with the at least a portion of the software application. Monitoring the plurality of individual actions may include associating one or more individual actions of the plurality of individual actions with a specific user from a plurality of users. Determining whether the plurality of individual actions executed on the at least a portion of the software application complete at least one test case of a plurality of test cases may include recording each completion of the at least one test case of the plurality of test cases. Marking the at least one test case as completed may include marking the at least one test case as completed in response to determining that the at least one test case has been completed at least a predefined number of times.

In another example implementation, a computing system may include one or more processors and one or more memories, wherein the computing system is configured to perform operations that may include but are not limited to monitoring a plurality of individual actions executed on at least a portion of a software application. The operations may further include determining whether the plurality of individual actions executed on the at least a portion of the software application complete at least one test case of a plurality of test cases. The at least one test case may be marked as completed based upon, at least in part, determining that the plurality of individual actions executed on the at least a portion of the software application complete the at least one test case of the plurality of test cases.

One or more of the following example features may be included. A test case of the plurality of test cases may be defined as a plurality of individual actions executed on the at least a portion of the software application. Defining the test case may include defining the test case as a predefined sequence of individual actions executed on the at least a portion of the software application. Defining the test case may include inserting a plurality of code hooks into code associated with the at least a portion of the software application. Monitoring the plurality of individual actions may include associating one or more individual actions of the plurality of individual actions with a specific user from a plurality of users. Determining whether the plurality of individual actions executed on the at least a portion of the software application complete at least one test case of a plurality of test cases may include recording each completion of the at least one test case of the plurality of test cases. Marking the at least one test case as completed may include marking the at least one test case as completed in response to determining that the at least one test case has been completed at least a predefined number of times.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE SEVERAL VIEWS OF THE DRAWINGS

Like reference symbols in the various drawings indicate like elements.

DETAILED DESCRIPTION

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
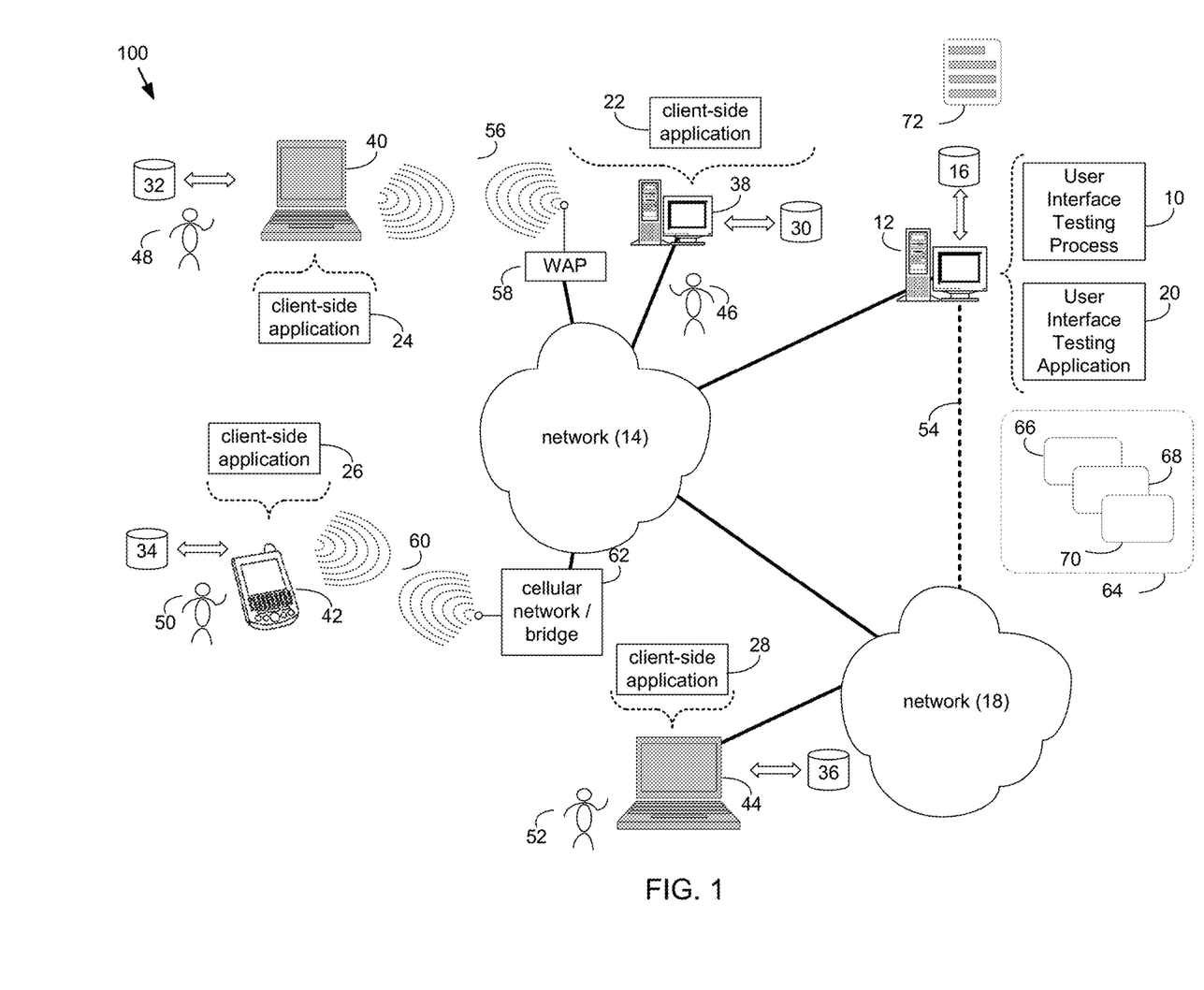
FIG. 1 is an example diagrammatic view of user interface testing process coupled to a distributed computing network according to one or more example implementations of the disclosure.
Figure 2:
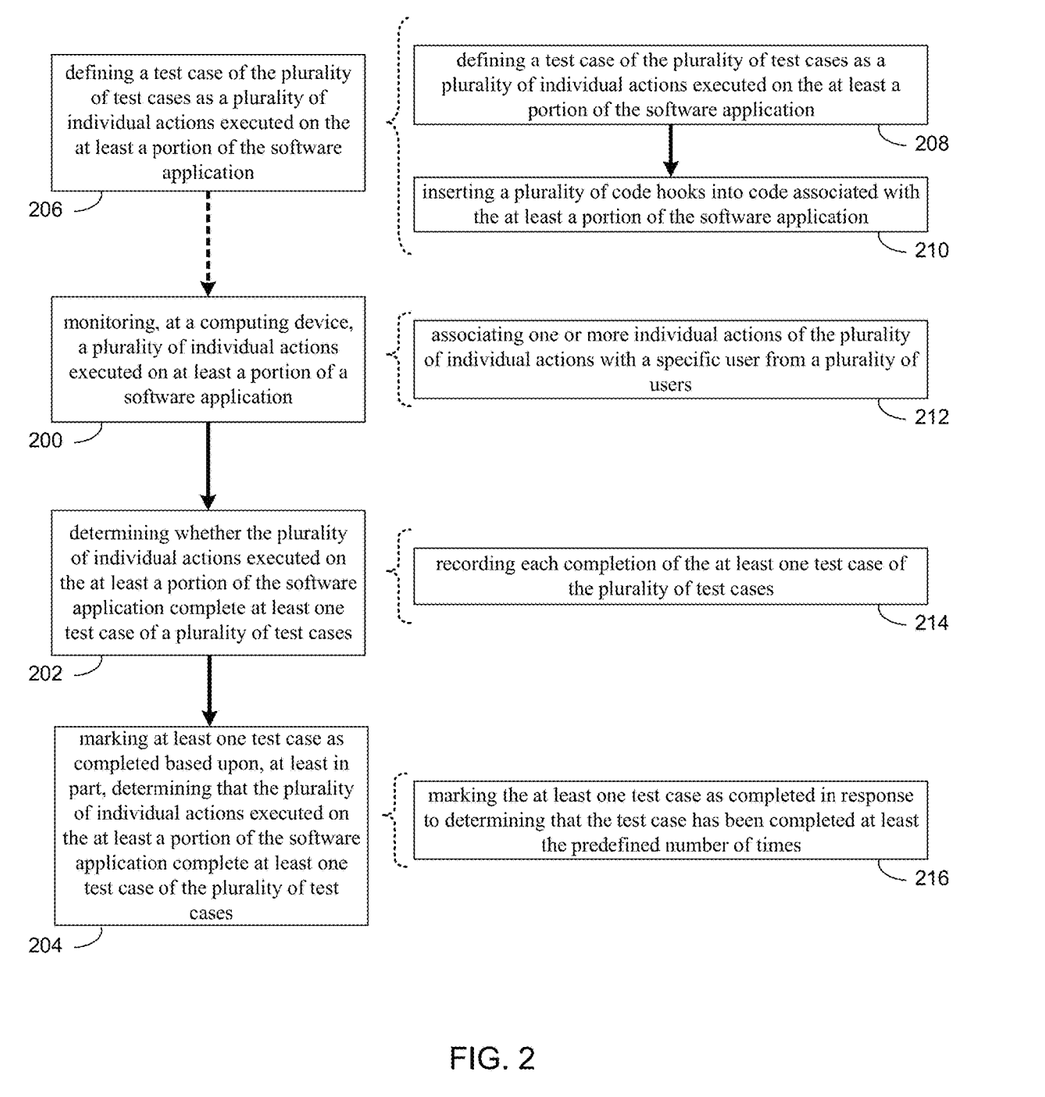
FIG. 2 is an example flowchart of the user interface testing process of FIG. 1 according to one or more example implementations of the disclosure.

Referring now to FIG. 1, there is shown user interface testing process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a user interface testing process, such as user interface testing process 10 of FIG. 1, may monitor, at a computing device, a plurality of individual actions executed on at least a portion of a software application. User interface testing process 10 may determine whether the plurality of individual actions executed on the at least a portion of the software application complete at least one test case of a plurality of test cases. The at least one test case may be marked as completed based upon, at least in part, determining that the plurality of individual actions executed on the at least a portion of the software application complete the at least one test case of the plurality of test cases.

The instruction sets and subroutines of user interface testing process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

User interface testing process 10 may be a stand-alone application that interfaces with an applet/application that is accessed via client applications 22, 24, 26, 28, 66. In some embodiments, user interface testing process 10 may be, in whole or in part, distributed in a cloud computing topology. In this way, computing device 12 and storage device 16 may refer to multiple devices, which may also be distributed throughout network 14 and/or network 18.

Computing device 12 may execute a user interface testing application (e.g., user interface testing application 20), examples of which may include, but are not limited to, application development tools, user interface development software, user interface testing software, etc. User interface testing process 10 and/or user interface testing application 20 may be accessed via client applications 22, 24, 26, 28, 66. User interface testing process 10 may be a stand-alone application, or may be an applet/application/script/extension that may interact with and/or be executed within user interface testing application 20, a component of user interface testing application 20, and/or one or more of client applications 22, 24, 26, 28, 66. User interface testing application 20 may be a stand-alone application, or may be an applet/application/script/extension that may interact with and/or be executed within user interface testing process 10, a component of user interface testing process 10, and/or one or more of client applications 22, 24, 26, 28, 66. One or more of client applications 22, 24, 26, 28, 66 may be a stand-alone application, or may be an applet/application/script/extension that may interact with and/or be executed within and/or be a component of user interface testing process 10 and/or user interface testing application 20. Examples of client applications 22, 24, 26, 28, 66 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 66 which may be stored on storage devices 30, 32, 34, 36, coupled to client electronic devices 38, 40, 42, 44, and/or camera system 64 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 66 may be configured to effectuate some or all of the functionality of user interface testing process 10 (and vice versa). Accordingly, user interface testing process 10 may be a purely server-side application, a purely client-side application, or a hybrid server-side/client-side application that is cooperatively executed by one or more of client applications 22, 24, 26, 28, 66 and/or user interface testing process 10.

One or more of client applications 22, 24, 26, 28, may be configured to effectuate some or all of the functionality of user interface testing application 20 (and vice versa). Accordingly, user interface testing application 20 may be a purely server-side application, a purely client-side application, or a hybrid server-side/client-side application that is cooperatively executed by one or more of client applications 22, 24, 26, 28 and/or user interface testing application 20. As one or more of client applications 22, 24, 26, 28, user interface testing process 10, and user interface testing application 20, taken singly or in any combination, may effectuate some or all of the same functionality, any description of effectuating such functionality via one or more of client applications 22, 24, 26, 28, user interface testing process 10, user interface testing application 20, or combination thereof, and any described interaction(s) between one or more of client applications 22, 24, 26, 28, user interface testing process 10, user interface testing application 20, or combination thereof to effectuate such functionality, should be taken as an example only and not to limit the scope of the disclosure.

Users 46, 48, 50, 52 may access computing device 12 and user interface testing process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. User interface testing process 10 may include one or more user interfaces, such as browsers and textual or graphical user interfaces, through which users 46, 48, 50, 52 may access user interface testing process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-7, user interface testing process 10 may monitor 200, at a computing device, a plurality of individual actions executed on at least a portion of a software application. User interface testing process 10 may determine 202 whether the plurality of individual actions executed on the at least a portion of the software application complete at least one test case of a plurality of test cases. At least one test case may be marked 204 as completed based upon, at least in part, determining that the plurality of individual actions executed on the at least a portion of the software application complete at least one test case of the plurality of test cases.

In some implementations consistent with the present disclosure, systems and methods may be provided to test functional coverage of an application user interface (defined product use cases) as opposed to code coverage. Code coverage can be represented as lines of code, branches, functions, and other metrics related to testing of each line of code, branch, function, etc. of the code itself. Embodiments of user interface testing process 10 may provide solutions to the challenges associated with testing of high-level user interface features and sequences of actions taken by the user, regardless of which or how many lines of code (or branches, etc.) are executed. For example, manual testing of an application user interface may require teams of testers manually executing test cases by following sets of instructions during designated testing time windows. However, this process is expensive both in terms of resources and time, as it requires a large team dedicated to manual testing and can slow the release cycle of an application.

Automated testing processes (e.g., using a browser automation tool such as Selenium®) have been utilized in application user interface testing. These processes have the advantage of reducing both the resources and time required to execute tests. Since the test cases are completely automated for automated testing processes, this approach also may make it easy to calculate how much of the product functionality is covered, and gives confidence that the same degree of coverage is achieved on each release. However, such automated tests are limited to only problems which can be identified by a machine. For example, it is difficult for these tools to determine if a user interface "looks good" or "is intuitive". Additionally, it can also be difficult for these automated tools to verify that unintended side effects do not occur. In contrast to these conventional processes, embodiments of user interface testing process 10 may allow a user to define test cases as a plurality of individual actions executed on at least a portion of a software application and/or a user interface of an application. Execution of these test cases may be monitored in the background of a user's interaction with the software application and/or user interface of the software application. When a tester's actions are determined to have satisfied or to have completed the plurality of actions associated with a test case, user interface process 10 may mark the test case as completed. In this way, users may test functional aspects of a software application and/or a user interface of a software application without knowingly or intentionally trying to follow a prescribed test case. In some implementations, user interface testing process 10 may provide a testing environment which may be a more accurate representation of how end-users may interact with the software application and/or the application user interface during normal use.

In some implementations, user interface testing process 10 may define 206 a test case of a plurality of test cases as a plurality of individual actions executed on at least a portion of the software application. Referring to the example of FIG. 3 and in some implementations, suppose that a development team (e.g., users 46, 48, 50, 52) is developing an electronic communication client with a user interface (e.g., user interface 300). In some implementations, the user interface (e.g., user interface 300) may include one or more buttons (e.g., button 302, 304, 306, 308, 310) associated with various functions, such as composing a new email (e.g., button 302), accessing an inbox (e.g., button 304), accessing sent messages (e.g., button 306), accessing draft messages (e.g., button 308), and/or accessing an outbox with outgoing emails (e.g., button 310). Referring to the example of FIG. 4 and in some implementations, and in response to a user selecting (e.g., via a cursor, a voice command, or other user input) a compose button of user interface 300, user interface 300 may be configured to render a pop-up window (e.g., pop-up window 400) with a recipient text field (e.g., text field 402), a subject text field (e.g., text field 404), a message text field (e.g., text field 406), an option to attach one or more files to the email (e.g., button 408), an option to send the email (e.g., button 410), an option to save the email message as a draft (e.g., button 412), and/or an option to cancel the email (e.g., button 414).

Figure 3:
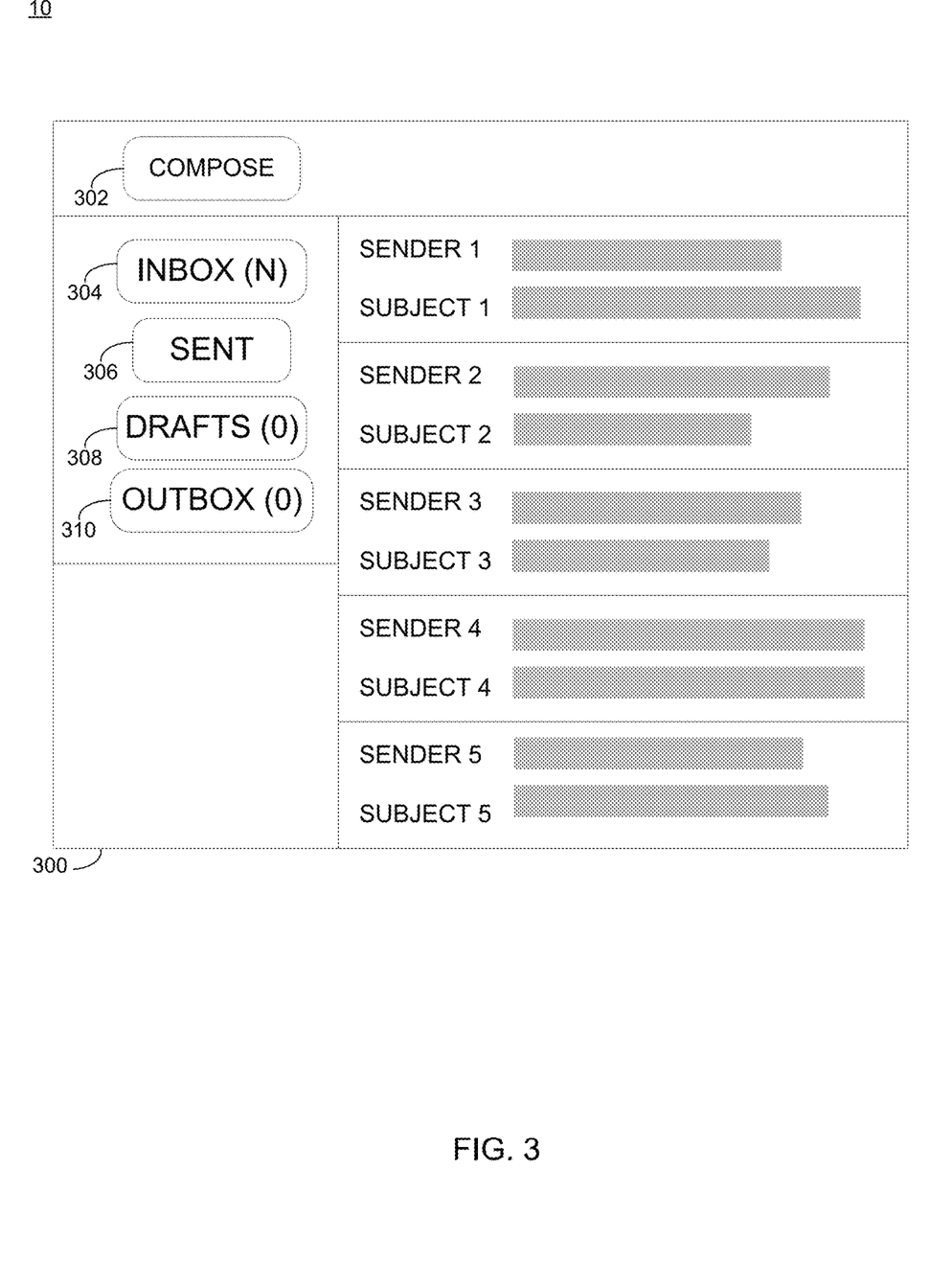
FIGS. 3-5 are example diagrammatic views of portions of a software application that may be tested according to one or more example implementations of the disclosure.
Figure 4:
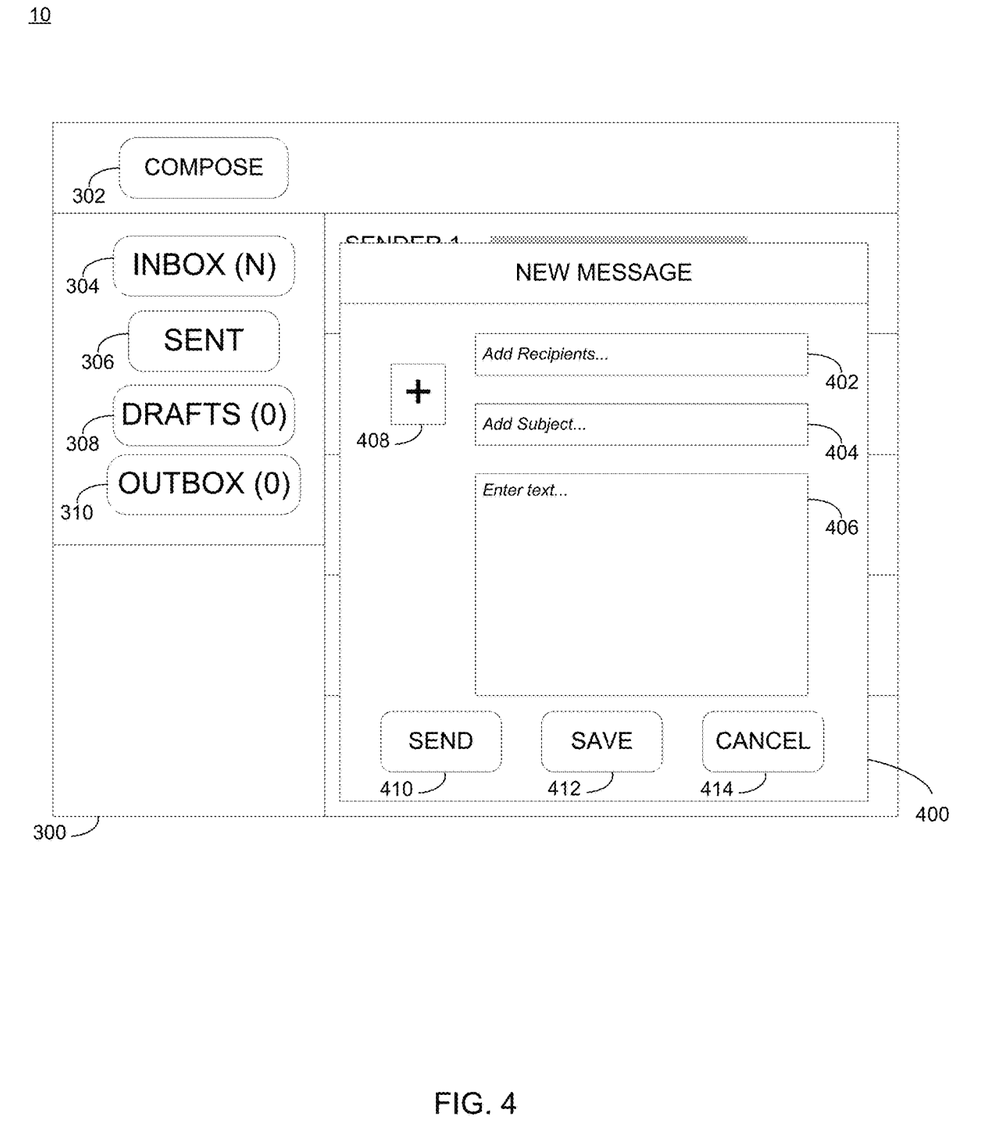

To ensure that the user interface (e.g., user interface 300) is able to perform certain functions, a user (e.g., user 46) may define 206 (via user interface testing process 10) a test case (e.g., test case 66) as a plurality of individual actions executed on at least a portion of user interface 300. For example, suppose user 46 wants to test the user interface feature of e.g., sending an email with text. User 46 may define 206 (via user interface testing process 10) the test case (e.g., test case 66) as the individual actions of selecting a "compose" button (e.g., button 302); entering text into a message text field (e.g., text field 406) of a pop-up window (e.g., pop-up window 400); and/or selecting a "send" button (e.g., button 410). While the above example has been provided of a test case including a plurality of actions for sending an email with text, it will be appreciated that other examples may be used within the scope of the present disclosure. In some implementations, user interface testing process 10 may provide a user interface (not shown) for defining 206 the test case as a plurality of individual actions executed on at least a portion of the software application. In some implementations and as will be discussed in greater detail below, each test case may be stored in a database or other storage device (e.g., storage device 16) to define a plurality of test cases (e.g., plurality of test cases 64).

In some implementations, defining 206 the test case may include defining 208 the test case as a predefined sequence of individual actions executed on the at least a portion of the software application. For example and in some implementations, suppose a user (e.g., user 46) wants to test the user interface feature of e.g., attaching a file to an email after adding text. In this test case, the sequence of individual actions may be important to the execution of user interface 300. To address these situations where the sequence of actions may affect the desired functionality of a user interface, a user (e.g., user 46) may define 208 the test case (e.g., test case 68) as a sequence of individual actions of 1) selecting a "compose" button (e.g., button 302); 2) entering text into a message text field (e.g., text field 406) of a pop-up window (e.g., pop-up window 400); 3) selecting an "attach" button (e.g., button 408); and/or 4) selecting a file in another pop-up window (not shown) for attaching to the email message. While an example discussing the sequence of attaching a file to an email has been described, it will be appreciated that other predefined sequences of actions may be defined 208 within the scope of the present disclosure.

In some implementations, defining 206 the test case may include defining a predefined minimum number of times a test case must be executed or completed for marking 204 the test case as complete. For example and in some implementations, successful completion of a test case one time may be user-specific or context-specific, whereas if tested more exhaustively by other users, the user interface may demonstrate other problems. In some implementations, the predefined number of times a test case must be successfully executed or completed before marking 204 the test case completed may be user-defined (e.g., via a user interface) and/or may be an editable default number of times defined by user interface testing process 10.

In some implementations, defining 206 the test case may include inserting 210 a plurality of code hooks into code associated with the at least a portion of the software application. For example, suppose a user (e.g., user 46) wants to test the user interface feature(s) of e.g., adding a recipient to an email, saving the message as a draft, and then subsequently sending the draft email. As discussed above, user interface testing process 10 may define 206 the test case (e.g., test case 70) as a plurality of individual actions executed by a user on at least a portion of the software application and/or user interface. In this example, the test case (e.g., test case 70) for sending an email with text may include the individual actions of selecting a "compose" button (e.g., button 302); entering a recipient email address into a recipient text field (e.g., text field 402) of a pop-up window (e.g., pop-up window 400); selecting a "save" button (e.g., button 412); selecting a draft messages button (e.g., button 308) to access draft messages; and/or selecting a "send" button (e.g., button 410) to send the email. In some implementations, user interface testing process 10 may insert 210 code hooks into each portion of the code associated with each of these individual actions. A code hook may generally include executable code which, when encountered in the code (e.g., by user action through implementations of user interface testing process 10), may execute code specific to the code hook. For example, in the case of a web application, there would be a code hook that uploads some metadata about the action to a server. The server would collect the metadata, organize it by user, etc. In this manner, inserting 210 code hooks into the code may include receiving code hooks from a user manually placing the code hooks into the code of the software application and/or user interface.

For example, user interface testing process 10 may insert 210 or embed a code hook into the portion of code associated with e.g., selecting a "compose" button (e.g., button 302). As such, when a user selects e.g., the compose button (e.g., button 302), the inserted 210 code hook may execute to cause e.g., an event logging action to be triggered to indicate that a user has selected the "compose" button (e.g., button 302). For example and in some implementations, user interface testing process 10 may log or otherwise record the selection of button 302 via the code hook inserted 210 into the code of the user interface (e.g., user interface 300). It will be appreciated that code hooks may be inserted 210 into any portion of the user interface code for identifying when a particular action is executed by a user. As will be discussed in greater detail below, logging or recording of individual actions executed on the software application and/or user interface may be monitored 200 by user interface testing process 10 and may be used to determine 202 whether the actions complete a test case.

Figure 5:
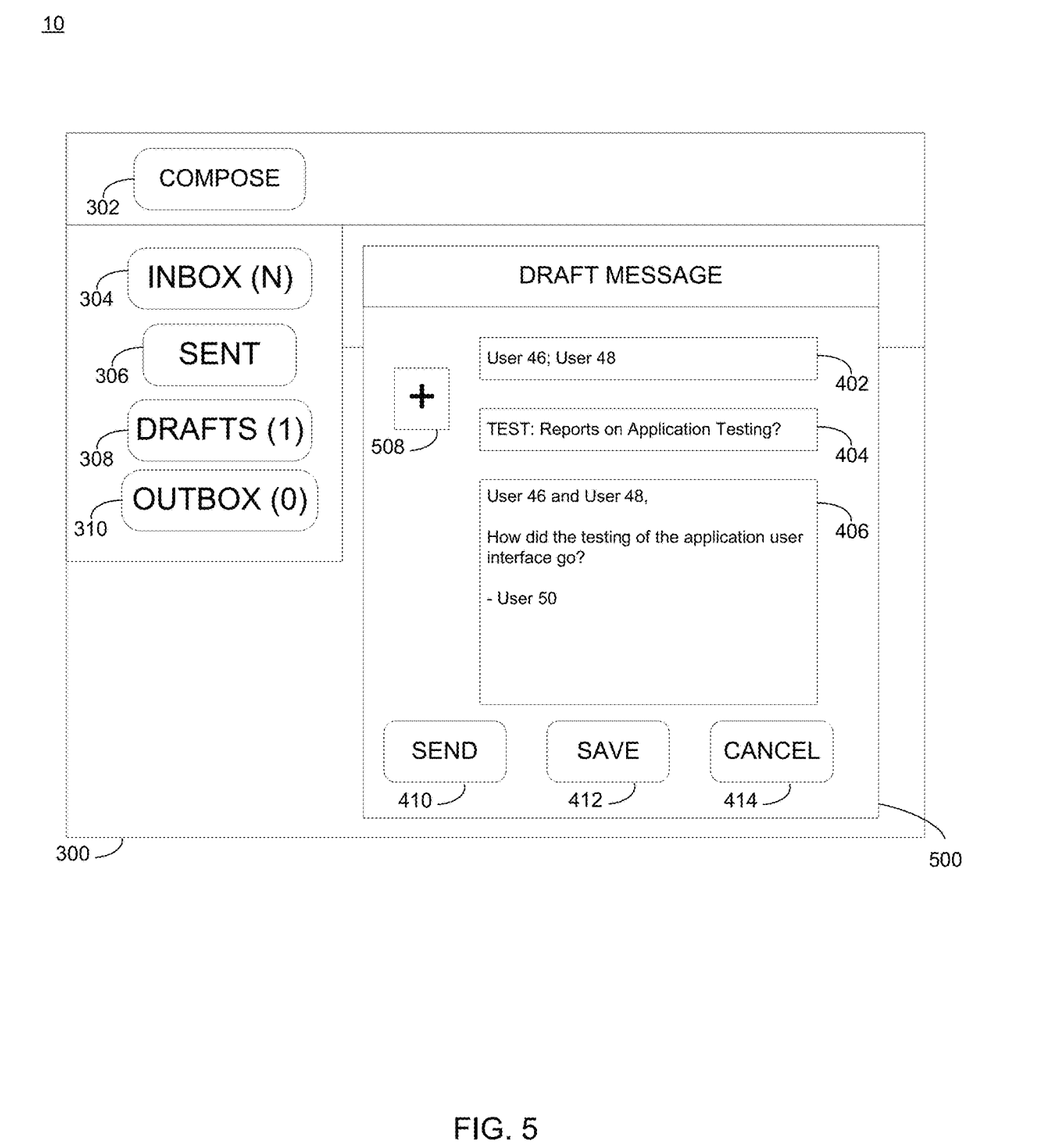

In some implementations, user interface testing process 10 may monitor 200, at a computing device, a plurality of individual actions executed on at least a portion of a software application. For example, user interface testing process 10 may monitor 200 user analytics data from the application. User analytics data may generally include logs and/or other application data indicating the actions executed by one or more users on the software application and/or user interface. For example, user analytics data may include log files (e.g., log file 72) generated by execution of the plurality of inserted 210 code hooks. In one example, a user may interact with the user interface 300 by selecting a compose button (e.g., button 302); adding one or more recipients into a recipient text field (e.g., text field 402); entering text into a message text field (e.g., text field 404); and saving the draft of the email message by selecting a save button (e.g., button 412). Suppose the user (e.g., user 48) subsequently selects a button to access draft messages (e.g., button 308); selects the draft message for rendering in a pop-up window (e.g., pop-up window 500); and selects the send button (e.g., button 410). As discussed above, one or more of these actions may include code hooks inserted 210 into the code associated with action. In some implementations, execution of actions with code hooks inserted 210 into the code may cause user interface testing process 10 to log or otherwise record each execution of each action. In some implementations, user interface testing process 10 may record each code hook execution to a log (e.g., log 72) of user interactions with the user interface. In this manner, user interface testing process 10 may monitor 200 the plurality of individual actions by logging and/or recording the execution of the code hook(s) associated with each individual action.

In some implementations, monitoring 200 the plurality of individual actions may include associating 212 one or more individual actions of the plurality of individual actions with a specific user from a plurality of users. For example, suppose a team of testers (e.g., users 46, 48, 50, 52) are testing user interface 300. During the interaction of the plurality of testers or users, various individual actions may be executed on the user interface 300. However and as discussed above, certain test cases may require execution of a pre-defined sequence of individual actions to complete or satisfy the test case. As such, a plurality of potentially disparate actions by a plurality of users may satisfy or complete all of the defined actions for one or more test cases, user interface testing process 10 may associate 212 one or more individual actions of the plurality of actions with a specific user of a plurality of users. In this manner, the sequence of a specific user may be monitored 200 and used to determine 202 whether a plurality of individual actions complete at least one test case. In some implementations, user interface testing process 10 may define or organize the plurality of monitored user actions by associated an user within with the log (e.g., log 72). In some implementations, user interface testing process 10 may associate 212 the one or more individual actions with a user based upon, at least in part, a user login associated with a user interface testing application (e.g., user interface testing application 20), an IP address, one or more cookies of a computing device utilized by a user, and/or other user-identifiers. For example, user interface testing process 10 may assign IDs to each user account. For users who don't log in, analytics services may either assign a short-lived random ID (e.g., just to use during one visit to a website) or try to use some other identifier as the user ID (e.g., IP address, mobile device ID, etc.). It will be appreciated that various user identifiers may be used to associate 212 the one or more individual user actions with a user within the scope of the present disclosure.

While examples have been described of monitoring the interactions of a development team, it will be appreciated that user interface testing process 10 may monitor the plurality of individual actions executed by a plurality of users (e.g., non-testers, beta testers, and/or actual users). In some implementations, user interface testing process 10 may monitor 200 the plurality of individual actions executed by a plurality of users accessing a software application and/or a user interface of a software application in real-time (i.e., while users are interacting with the software application and/or the user interface of a software application) with or without the users being aware of this monitoring. For example and as will be discussed in greater detail below, user interface testing process 10 may mark 204 at least one test case as completed without interrupting and/or without prompting users interacting with the software application and/or a user interface of the software application.

In some implementations, user interface testing process 10 may determine 202 whether the plurality of individual actions executed on the at least a portion of the software application complete at least one test case of a plurality of test cases. In some implementations, user interface testing process 10 may determine 202 that each action of the defined 206 set of individual actions of a test case is or has been performed by at least a portion of the actions executed by a user on the software application and/or a user interface of the software application. For example, suppose at least three test cases have been defined for user interface 300. A first test case (e.g., test case 66) of the plurality of test cases (e.g., plurality of test cases 64) may be defined 206 via user interface testing process 10 to include the individual actions of selecting a "compose" button (e.g., button 302); entering text into a message text field (e.g., text field 406) of a pop-up window (e.g., pop-up window 400); and/or selecting a "send" button (e.g., button 410). A second test case (e.g., test case 68) may be defined 206 via user interface testing process 10 to include the individual actions of 1) selecting a "compose" button (e.g., button 302); 2) entering text into a message text field (e.g., text field 406) of a pop-up window (e.g., pop-up window 400); 3) selecting an "attach" button (e.g., button 408); and/or 4); selecting a file in another pop-up window (not shown) for attaching to the email message. A third test case may be defined 206 to include the individual actions of selecting a "compose" button (e.g., button 302); entering a recipient email address into a recipient text field (e.g., text field 402) of a pop-up window (e.g., pop-up window 400); selecting a "save" button (e.g., button 412); selecting a draft messages button (e.g., button 308) to access draft messages; and/or selecting a "send" button (e.g., button 410) to send the email. It will be appreciated that any number and any variety of test cases may be defined 206 to include individual actions executed on a software application and/or user interface within the scope of the present disclosure.

As discussed above, user interface testing process 10 may monitor 200 a user's (e.g., user 46) interaction with user interface 300 to include the actions of selecting a compose button (e.g., button 300); adding one or more recipients into a recipient text field (e.g., text field 402); entering text into a message text field (e.g., text field 406); and saving the draft of the email message by selecting a save button (e.g., button 410); subsequently selecting a button to access draft messages (e.g., button 308); selecting the draft message for rendering in a pop-up window (e.g., pop-up window 500); and selecting the send button (e.g., button 410). In some implementations, user testing interface 300 may compare the plurality of individual user actions to the defined test cases (e.g., plurality of test cases 64). With the example user interaction data as described above, user interface process 10 may determine 202 that test case 66 and test case 70 have been completed but that test case 68 has not been completed based upon, at least in part, the monitored 200 plurality of individual actions executed by user 46 on the user interface (e.g., user interface 300).

For example, in response to user interface testing process 10 monitoring 200 user 46's actions of selecting a compose button (e.g., button 300); adding one or more recipients into a recipient text field (e.g., text field 402); entering text into a message text field (e.g., text field 406); and saving the draft of the email message by selecting a save button (e.g., button 410); subsequently selecting a button to access draft messages (e.g., button 308); selecting the draft message for rendering in a pop-up window (e.g., pop-up window 500); and selecting the send button (e.g., button 410), user interface testing process 10 may determine 202 that the individual actions that define test case 66 (i.e., selecting a "compose" button (e.g., button 302); entering text into a message text field (e.g., text field 406) of a pop-up window (e.g., pop-up window 400); and/or selecting a "send" button (e.g., button 410)) have been completed and that the individual actions that define test case 70 (i.e., selecting a "compose" button (e.g., button 302); entering a recipient email address into a recipient text field (e.g., text field 402) of a pop-up window (e.g., pop-up window 400); selecting a "save" button (e.g., button 410); selecting a draft messages button (e.g., button 308) to access draft messages; and/or selecting a "send" button (e.g., button 410) to send the email) have been completed.

In some implementations, user testing interface process 10 may determine 202 that test case 66 and/or test case 70 have been completed even though there may be one or more intervening user actions executed on the software application and/or the user interface of the software application between the defined 206 individual actions that comprise a test case. For example, test case 66 may include the individual actions of selecting a "compose" button (e.g., button 302); entering text into a message text field (e.g., text field 406) of a pop-up window (e.g., pop-up window 400); and/or selecting a "send" button (e.g., button 410). As discussed above, a user may e.g., select a compose button (e.g., button 300); add one or more recipients into a recipient text field (e.g., text field 402); enter text into a message text field (e.g., text field 406); save the draft of the email message by selecting a save button (e.g., button 410); subsequently select a button to access draft messages (e.g., button 308); select the draft message for rendering in a pop-up window (e.g., pop-up window 500); and select the send button (e.g., button 410). In some implementations, even though a user may have e.g., saved the message as a draft before sending the email, user interface testing process 10 may determine 202 that the individual actions performed all of the defined 206 actions of the test case 66. In some implementations, user testing interface process 10 may determine 202 that the combination of individual actions complete a test case when the combination of actions is performed in the sequence defined 208 by user interface testing process 10. For example, in some implementations, the individual actions that comprise a test case may be defined 208 as a sequence of actions including intervening actions. In some implementations, the individual actions that comprise a test case may be defined 208 as a sequence of actions excluding intervening actions. In other words, if a monitored 200 plurality of user actions includes any intervening actions, user interface testing process 10 may determine 202 that the plurality of actions do not complete at least on test case.

Continuing with the above example, in response to user interface testing process 10 monitoring 200 user 46's actions of selecting a compose button (e.g., button 300); adding one or more recipients into a recipient text field (e.g., text field 402); entering text into a message text field (e.g., text field 406); and saving the draft of the email message by selecting a save button (e.g., button 410); subsequently selecting a button to access draft messages (e.g., button 308); selecting the draft message for rendering in a pop-up window (e.g., pop-up window 500); and selecting the send button (e.g., button 410)), user interface testing process 10 may determine 202 that the individual actions that define test case 68 (i.e., 1) selecting a "compose" button (e.g., button 302); 2) entering text into a message text field (e.g., text field 406) of a pop-up window (e.g., pop-up window 400); 3) selecting an "attach" button (e.g., button 408); and/or 4) selecting a file in another pop-up window (not shown) for attaching to the email message) have not been completed. In this example, user interface testing process 10 may determine 202 that test case 68 has not been completed based upon, at least in part, monitoring 200 the plurality of individual actions executed on at least a portion of the software application and/or user interface.

Figure 6:
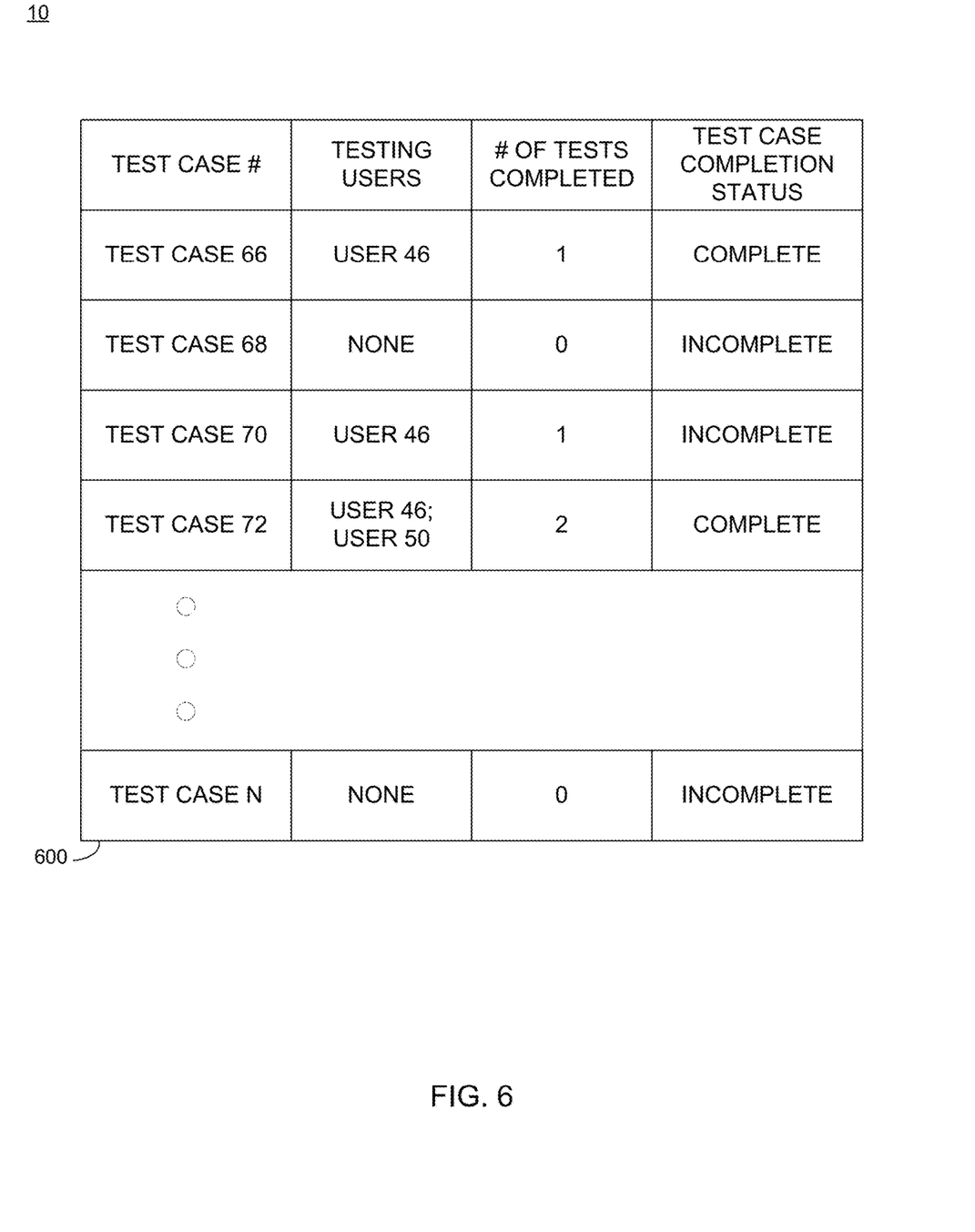
FIG. 6 is an example diagrammatic view of a list of test cases, marked as complete or incomplete, generated by a user interface testing process of FIG. 1 according to one or more example implementations of the disclosure.

Referring also to the example of FIG. 6 and in some implementations, determining 202 whether the plurality of individual actions executed on the at least a portion of the software application complete at least one test case of a plurality of test cases may include recording 214 each completion of the at least one test case of the plurality of test cases. Returning to the above example and based upon, at least in part, the monitored plurality of individual actions executed on user interface 300, user interface testing process 10 may record 214 that test case 66 and test case 70 have been completed one time and that test case 68 has not been completed or has been completed zero times. In some implementations, user interface testing process 10 may record 214 each completion of the at least one test case (e.g., test cases 66, 70) in a data structure or database. In some implementations, user interface testing process 10 may record 214 the completion of each test case in a user interface (e.g., user interface 600) accessible by user interface testing process 10.

In some implementations, user interface testing process 10 may mark 204 at least one test case as completed based upon, at least in part, determining 202 that the plurality of individual actions executed on the at least a portion of the software application complete at least one test case of the plurality of test cases. For example, user interface testing process 10 may mark 204 test cases 66, 70 as complete based upon, at least in part, determining 202 that the plurality of individual actions executed on user interface 300 complete test case 66 and test case 70 of the plurality of test cases (e.g., plurality of test cases 64). In some implementations, user interface testing process 10 may mark test cases as complete in a data structure or database. In some implementations, user interface testing process 10 may mark 204 the completion of each test case in a user interface (e.g., user interface 600) accessible by user interface testing process 10. In this manner, the test cases that have been completed may be observed by testers or other users of user interface 600. In some implementations, user interface testing process 10 may mark 204 test case 68 as incomplete based upon, at least in part, determining 202 that the plurality of individual actions executed on user interface 300 do not complete test case 68. User interface testing process 10 may mark 204 test case 68 as incomplete in user interface 600 as shown in FIG. 6.

In some implementations, marking 204 the at least one test case as completed may include marking 216 the at least one test case as completed in response to determining that the at least one test case has been completed at least a predefined number of times. For example and as discussed above, one or more test cases may be defined 206 to include a predefined number of times the test case may be executed before marking 204 the test case complete. For example, suppose test case 66 has been defined to be marked 204 complete when the test case is completed at least e.g., one time. Suppose test case 68 has been defined to be marked 204 complete when the test case is completed at least e.g., one time. Further, suppose test case 70 has been defined to be marked 204 complete when the test case is completed at least e.g., three times. In this example, user interface testing process 10 may mark test case 66 as complete while test cases 68, 70 may be marked as incomplete in an user interface 600 based upon, at least in part, the pre-defined number of executions required before marking 204 the test case as complete. It will be appreciated that various pre-defined number of executions or completions may be defined and used within the scope of the present disclosure before marking 204 a test case as complete. For example, one test case may be defined with e.g., five executions needed before marking the test case as complete while another test case may be defined with e.g., ten executions needed before marking 204 the test case as complete.

Figure 7:
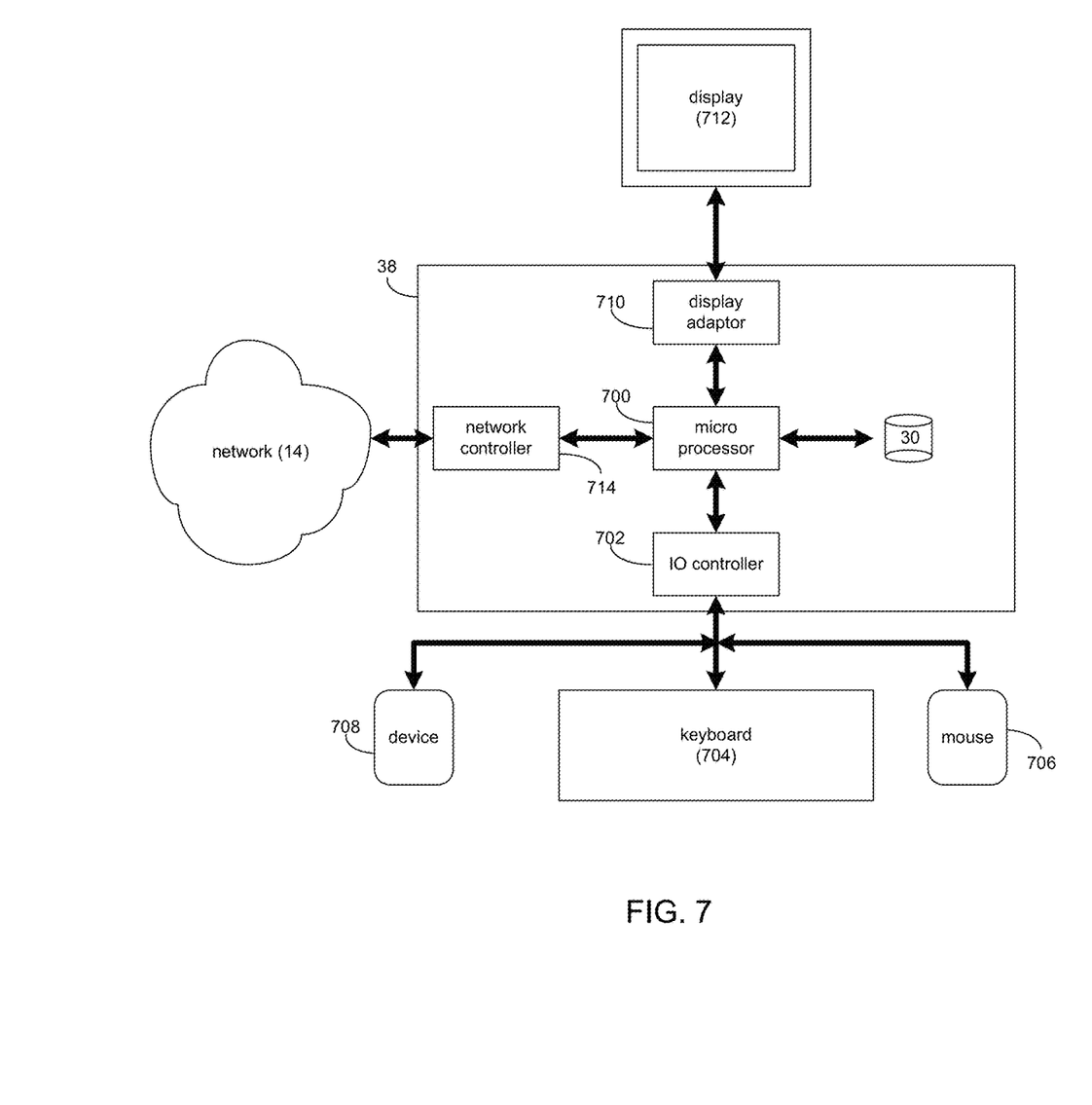
FIG. 7 is an example diagrammatic view of a client electronic device of FIG. 1 according to one or more example implementations of the disclosure.

Referring also to FIG. 7, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, user interface testing process 10 may be substituted for client electronic device 38 within FIG. 7, examples of which may include but are not limited to computing device 12 and/or client electronic devices 40, 42, 44.

Client electronic device 38 may include a processor and/or microprocessor (e.g., microprocessor 700) configured to, e.g., process data and execute the above-noted code/instruction sets and subroutines. Microprocessor 700 may be coupled via a storage adaptor (not shown) to the above-noted storage device(s) (e.g., storage device 30). An I/O controller (e.g., I/O controller 702) may be configured to couple microprocessor 700 with various devices, such as keyboard 704, pointing/selecting device (e.g., mouse 706), custom device, such a microphone (e.g., device 708), USB ports (not shown), and printer ports (not shown). A display adaptor (e.g., display adaptor 710) may be configured to couple display 712 (e.g., CRT or LCD monitor(s)) with microprocessor 700, while network controller/adaptor 714 (e.g., an Ethernet adaptor) may be configured to couple microprocessor 700 to the above-noted network 14 (e.g., the Internet or a local area network).

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   monitoring, at a computing device, a plurality of individual actions executed by a user on at least a portion of a software application;
   determining whether the plurality of individual actions executed on the at least a portion of the software application is completed for at least one test case of a plurality of test cases;
   for each time that the plurality of individual actions is completed for the at least one test case, determining a number of successful executions performed for the at least one test case; and
   as a result of the number of successful executions being a predefined number of times, the predefined number of times being greater than one, marking the at least one test case as completed.

2. The computer-implemented method of claim 1, further comprising:
   defining a test case of the plurality of test cases as a plurality of individual actions executed on the at least a portion of the software application.

3. The computer-implemented method of claim 2, wherein defining the test case includes defining the test case as a predefined sequence of individual actions executed on the at least a portion of the software application.

4. The computer-implemented method of claim 2, wherein defining the test case includes inserting a plurality of code hooks into code associated with the at least a portion of the software application.

5. The computer-implemented method of claim 1, wherein monitoring the plurality of individual actions includes associating one or more individual actions of the plurality of individual actions with a specific user from a plurality of users.

6. The computer-implemented method of claim 1, wherein determining whether the plurality of individual actions executed on the at least a portion of the software application complete at least one test case of a plurality of test cases includes recording each completion of the at least one test case of the plurality of test cases.

7. A computer program product comprising a non-transitory computer readable storage medium having a plurality of instructions stored thereon, which, when executed by a processor, cause the processor to perform operations comprising:
   monitoring a plurality of individual actions executed by a user on at least a portion of a software application;
   determining whether the plurality of individual actions executed on the at least a portion of the software application is completed for at least one test case of a plurality of test cases;

for each time that the plurality of individual actions is completed for the at least one test case, determining a number of successful executions performed for the at least one test case; and as a result of the number of successful executions being at least a predefined number of times, the predefined number of times being greater than one, marking the at least one test case as completed.

8. The computer program product of claim 7, further comprising instructions for:

defining a test case of the plurality of test cases as a plurality of individual actions executed on the at least a portion of the software application.

9. The computer program product of claim 8, wherein defining the test case includes defining the test case as a predefined sequence of individual actions executed on the at least a portion of the software application.

10. The computer program product of claim 8, wherein defining the test case includes inserting a plurality of code hooks into code associated with the at least a portion of the software application.

11. The computer program product of claim 7, wherein monitoring the plurality of individual actions includes associating one or more individual actions of the plurality of individual actions with a specific user from a plurality of users.

12. The computer program product of claim 7, wherein determining whether the plurality of individual actions executed on the at least a portion of the software application complete at least one test case of a plurality of test cases includes recording each completion of the at least one test case of the plurality of test cases.

13. A computing system including one or more processors and one or more memories configured to perform operations comprising:

monitoring a plurality of individual actions executed by a user on at least a portion of a software application;

determining whether the plurality of individual actions executed on the at least a portion of the software application is completed for at least one test case of a plurality of test cases;

for each time that the plurality of individual actions is completed for the at least one test case, determining a number of successful executions performed for the at least one test case; and as a result of the number of successful executions being at least a predefined number of times, the predefined number of times being greater than one, marking the at least one test case as completed.

14. The computing system of claim 13, wherein the operations further comprise:

defining a test case of the plurality of test cases as a plurality of individual actions executed on the at least a portion of the software application.

15. The computing system of claim 14, wherein defining the test case includes defining the test case as a predefined sequence of individual actions executed on the at least a portion of the software application.

16. The computing system of claim 14, wherein defining the test case includes inserting a plurality of code hooks into code associated with the at least a portion of the software application.

17. The computing system of claim 13, wherein monitoring the plurality of individual actions includes associating one or more individual actions of the plurality of individual actions with a specific user from a plurality of users.

\* \* \* \* \*